(12) United States Patent
Hatakeyama

(10) Patent No.: US 7,352,391 B1
(45) Date of Patent: Apr. 1, 2008

(54) METHOD OF CONTROLLING THE DISPLAY MODE AND THE RECORDING MODE OF AN ELECTRONIC STILL CAMERA

(75) Inventor: Kouki Hatakeyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 08/841,318

(22) Filed: Apr. 30, 1997

(30) Foreign Application Priority Data

May 8, 1996 (JP) .................................. 8-113906

(51) Int. Cl.
*H04N 9/73* (2006.01)
*H04N 5/225* (2006.01)

(52) U.S. Cl. ............................ 348/223.1; 348/220.1

(58) Field of Classification Search ............... 348/273, 348/282, 311, 322, 231, 333, 220, 220.1, 348/221.1, 222.1, 223.1
See application file for complete search history.

(56) References Cited

U.S. PATENT DOCUMENTS

| 4,054,915 A | * | 10/1977 | Sugihara ..................... 348/282 |
| 4,570,178 A | * | 2/1986 | Morimura et al. ............. 358/44 |
| 4,746,988 A | * | 5/1988 | Nutting et al. ............... 358/228 |
| 4,837,628 A | * | 6/1989 | Sasaki ......................... 358/209 |
| 4,924,316 A | * | 5/1990 | Kobayashi et al. ........ 348/222.1 |
| 4,929,824 A | * | 5/1990 | Miyazaki .................... 364/525 |
| 5,239,380 A | * | 8/1993 | Yokoyama ............. 358/213.22 |
| 5,444,482 A | * | 8/1995 | Misawa et al. ............. 348/220 |
| 5,508,739 A | * | 4/1996 | Suh ........................... 348/223.1 |
| 5,592,575 A | * | 1/1997 | Nakazato .................... 382/312 |
| 5,828,406 A | * | 10/1998 | Parulski et al. ............. 348/220 |
| 5,847,756 A | * | 12/1998 | Iura et al. ................... 348/220 |

FOREIGN PATENT DOCUMENTS

JP 4348685 12/1992

* cited by examiner

*Primary Examiner*—Lin Ye
*Assistant Examiner*—Nicholas G Giles
(74) *Attorney, Agent, or Firm*—Birch, Stewart, Kolasch & Birch, LLP

(57) ABSTRACT

An electronic still camera according to the invention picks up field image signals from a CCD image sensor by adding signal charges of two adjacent pixels and, based on the field image signals, displays a moving picture on an LCD according to an interlace-scanning method. In response to a shutter release operation, the still camera doubles the charge storage time of the CCD image sensor, and sequentially picks up signal charges from every pixel of the CCD image sensor to record the image signals of one frame, such that the recorded image signals have the same signal levels as the field image signals.

6 Claims, 3 Drawing Sheets

METHOD OF CONTROLLING THE DISPLAY MODE AND THE RECORDING MODE OF AN ELECTRONIC STILL CAMERA

BACKGROUND OF THE INVENTION

1. Field of the Invention

The present invention relates to a controlling method for an electronic still camera which picks up an image signal through a solid state imaging device such as a CCD (charge coupled device) image sensor, and records still pictures on a signal recording medium such as a card memory or a magnetic disc. More particularly, the present invention relates to a recording control method for an electronic still camera with an electronic view finder for displaying a moving picture of a photographic subject.

2. Background Arts

Electronic still cameras have been known, wherein a solid state imaging device photo-electrically converts an optical image into electric image signals, and the image signals are recorded as a still picture on a signal recording medium. The recorded image signal is read to display the still picture on a screen such as an LCD (liquid crystal display) or a CRT (cathod ray tube). Some still cameras adopt an optical view finder. But providing an optical view finder raises the cost of the still camera. In addition, the optical view finder is incapable of forming a clear image of a low brightness subject. Therefore, many still cameras adopt an electronic view finder to display a moving picture of photographic subject on a small LCD or a small CRT on the basis of image signals picked up through the same solid state imaging device that is used for recording, as disclosed for example in JPA 4-348685.

A solid state imaging device has a matrix of photo-electric sensor cells or pixels on its imaging surface, each pixel is cyclically charged with a photo-electric signal of an amount corresponding to received light quantity, and the charge stored in the pixel is read as an image signal. In front of the pixels, there are blue, green and red filters, so each pixel receives one of three colors of light. The charges are transferred in series to a signal processor, to be processed as three color image signals.

For the electronic view finder, image signals obtained through the solid state imaging device are transformed into an appropriate form for displaying a moving picture on the LCD or CRT. For example, to obtain field image signals according to the NTSC system, the solid state imaging device is driven at intervals of 1/60 seconds corresponding to the field frequency 60 Hz of the NTSC system, to sample signal charges of the pixels in accordance with the interlace-scanning method. By interlacing a field with a next field, a frame is displayed every 1/30 seconds on the LCD of the electronic view finder or on the CRT. Thus, a moving picture of a subject that the still camera is photographing is displayed on the electronic view finder in a real time fashion. Besides the function of framing, the electronic view finder allows to monitor the recorded still picture on the instant based on the image signals read from the signal recording medium.

As a method of interlacing the pixels of the solid state imaging device, recent video cameras adopt a charge transfer method, hereinafter referred to as pixel combination. According to the pixel combination method, an image signal of one color is obtained as a sum of signal charges of two adjacent pixels which receive the same color. Specifically, image signals for a first or odd field are obtained by adding the signal charge of each of those pixels aligned in even horizontal scanning lines of the CCD image sensor to the signal charge of one of those pixels detecting the same color in one of two adjacent odd horizontal scanning lines. Thereafter, to provide image signals for a second or even field, the signal charge of each pixel of the even horizontal scanning lines is added to the signal charge of one of those pixels detecting the same color in the other of the two adjacent odd horizontal scanning lines.

The field image signals, for the first and second fields are respectively processed for white balance correction and γ-correction in a conventional manner, and are interlaced with each other to display a frame of the moving picture on the electronic view finder. On the basis of the field image signals obtained in this way, the moving picture can also be displayed on an external monitor such as an external CRT with no problem.

On the other hand, when recording a still picture on the signal recording medium, it is desirable to read the signal charges of the individual pixels without combining or adding them, and record the image signals in the form of digital image data for each pixel, because the recorded image data of the still picture is expected to be processed for each pixel, e.g. in a personal computer to print or merge-print the still picture as a hard copy. Therefore, pixel-combined field image signals as above are inappropriate for recording. For this reason, the reading format of the solid state imaging device is switched over between when to pick up field image signals for displaying a moving picture, hereinafter called "a movie mode", and when to pick up image signals for recording a still picture, hereinafter called "a recording mode". In the recording mode, the still camera with the electronic view finder scans the individual pixels sequentially, and records an image signal for each pixel in the signal recording medium.

As a result, under the same exposure condition, the signal levels of the image signals for the still picture drops from those of the pixel-combined field image signals as being obtained by adding the signal charges of every two pixels. In the movie mode, white balance and exposure amount, e.g. charge storage time of the solid state imaging device, are automatically controlled depending upon the signal levels of the pixel-combined image signals. If the same white balance and the same exposure value as used for the movie mode are applied to the recording mode, reproduced still pictures would have improper low density and insufficient color balance due to the difference in signal level. However, controlling exposure based on the signal levels of image signals obtained from the individual pixels in the recording mode, i.e. after each shutter release, results in a longer time lag from the shutter release to the actual recording, so that the recorded still picture will be shifted in time from a desired one. This is apparently undesirable.

SUMMARY OF THE INVENTION

In view of the foregoing, a primary object of the present invention is to provide a controlling method for a still camera with an electronic view finder, whereby a still picture is recorded at an appropriate signal level on a recording medium in the recording mode as soon as the shutter is released, whereas a moving picture of the photographic subject is displayed in a real time fashion in the movie mode.

To achieve the above object, according to the present invention, when the still camera is switched over from the movie mode to the recording mode, the signal level of image signals to record are controlled based on the signal level of field image signals obtained by the pixel combination in the movie mode. Concretely, the exposure value, e.g. the aperture size of a photographic lens or the charge storage time of the solid state imaging device, or the gain of an amplifier at the output of the solid state imaging device is determined depending upon the signal level of the field image signals.

According to a preferred embodiment of the present invention, the charge storage time is doubled in the recording mode compared with the latest charge storage time used in the preceding movie mode. With the doubled exposure amount, the signal levels of the recording image signals can simply be set in the same and proper range as the field image signals. That is, the luminance and color balance of the recorded still picture can be set in the substantially same range as the moving picture displayed on the view finder.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
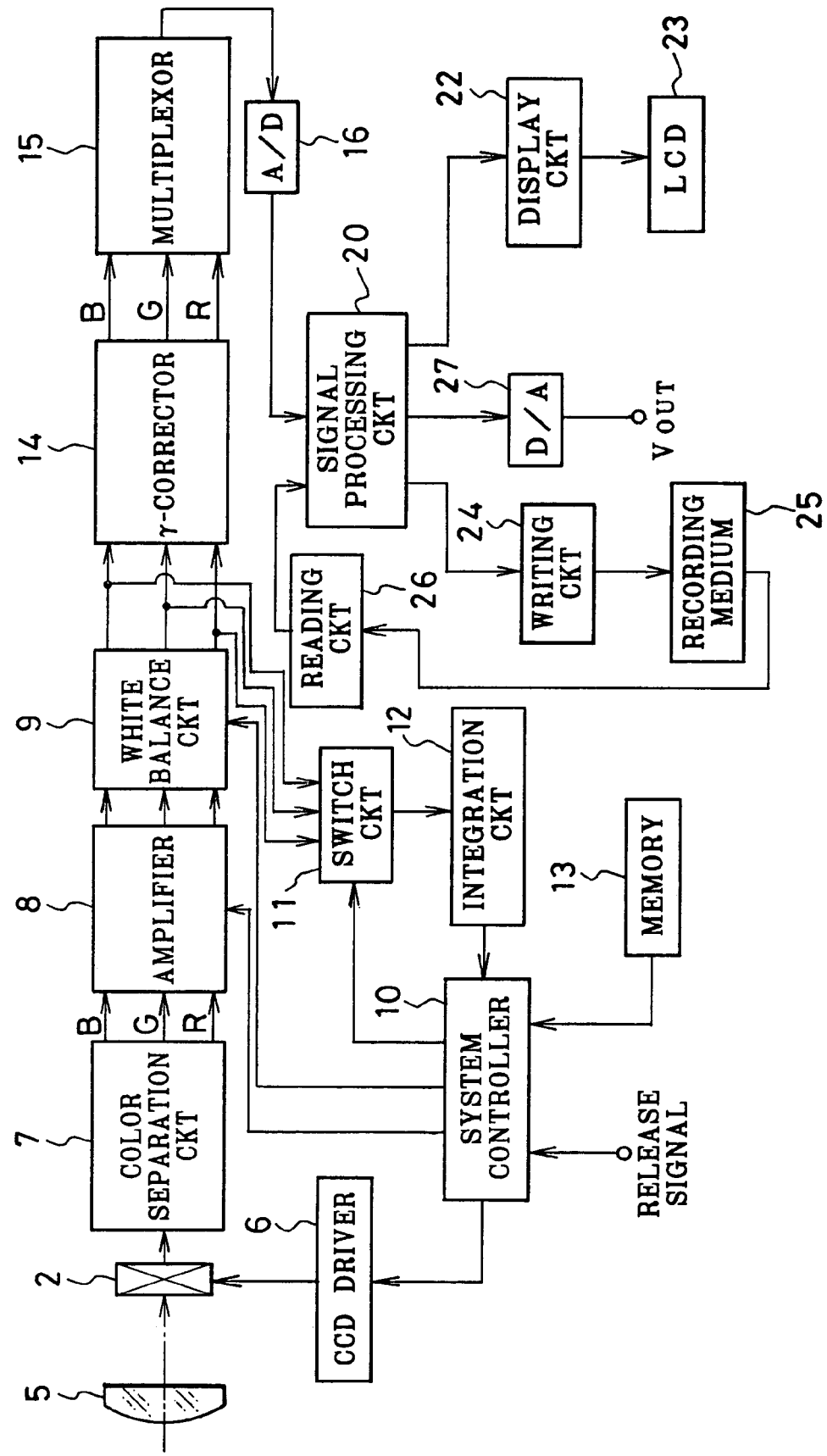
FIG. 1 shows a block diagram of an electronic still camera according to an embodiment of the present invention.
Figure 2:
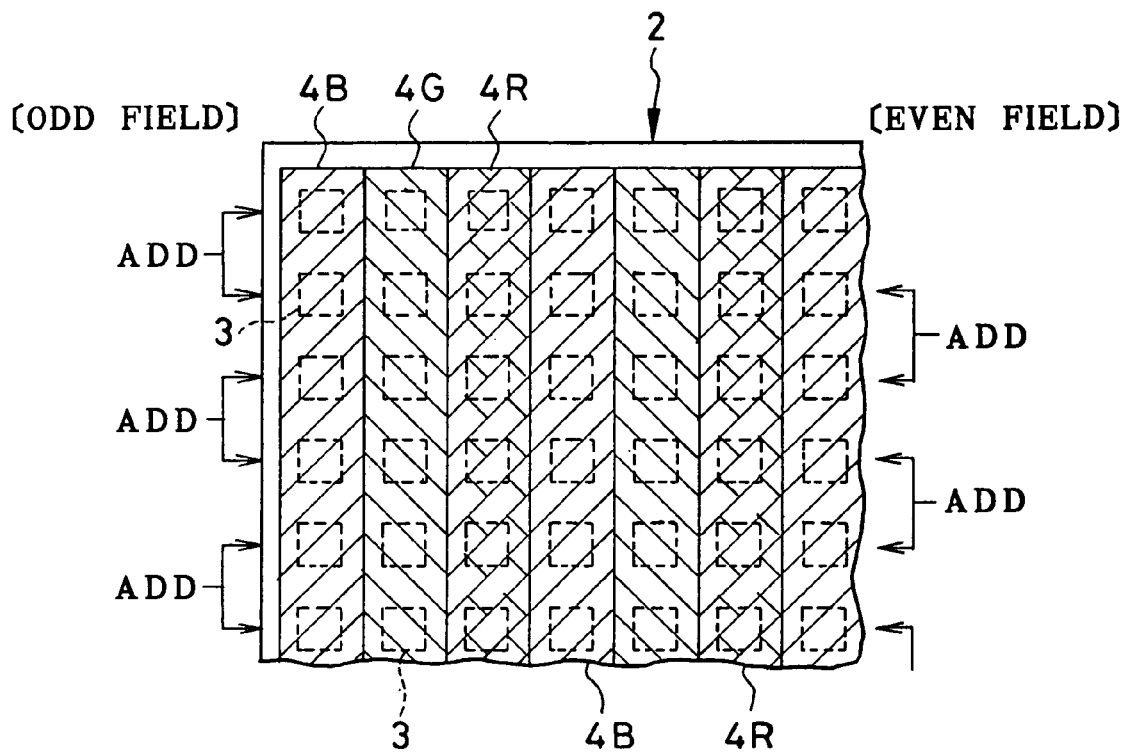
FIG. 2 shows an imaging surface of a CD image sensor used in the still camera.

In a still camera shown in FIG. 1, a CCD image sensor 2 is disposed behind a photographic lens 5, and is driven through a CCD driver 6. As shown in FIG. 2, the CCD image sensor 2 has a matrix of sensor cells or pixels 3 on its imaging surface, each pixel 3 accumulates an electric charge in a cycle determined by the CCD driver 6. In front of the pixels 3, there are blue, green and red filters 4B, 4G and 4R, so each pixel 3 receives one of three color light that passes through the corresponding one of the three color filters 4B, 4G and 4R.

The signal charges are transferred in serial to a color separation circuit 7, to be separated into blue, green and red image signals B, G and R. The three color separated image signals are amplified in an amplifier 8 with individual gains determined according to color in a way as set forth later. The amplified image signals are sent to a white balance circuit 9, which adjusts the signal levels of the blue image signal and the red image signal to the signal level of the green image signal such that the ratio of blue to green and the ratio of red to green are maintained unchanged. The white balance circuit 9 is for eliminating the influence of color temperature of illumination light on the photography.

The image signals from the white balance circuit 9 are sent via a switch circuit 11 to an integration circuit 12. A system controller 10 sends horizontal synchronizing signals HSYNC to the CCD driver 6 for driving the CCD image sensor 2, and also to the switch circuit 11. The switch circuit 11 operates synchronously with the horizontal synchronizing signals HSYNC, to send the image signals sequentially and color by color to the integration circuit 12. The integration circuit 12 integrates the image signals by each color in each field interval. The integrated value of each color is fed to the system controller 10.

The system controller 10 controls the white balance circuit 9 to keep the signal levels of the blue image signal and the red image signal in constant ratios to the signal level of the green image signal. The system controller 10 also controls the charge storage time or exposure time of the CCD image sensor 2 to adjust the level of luminance signal in a proper range. The luminance signal is obtained by weighting and adding the integrated values of the three color image signals from the integration circuit 12. Data of the exposure time determined by the system controller 10 is stored in a memory 13 along with data of the amplifier gains for three colors and white balance control data.

The image signals from the white balance circuit 9 are subjected to a gradation correction in a γ-corrector 14 and are, thereafter, sent to a multiplexor 15. The multiplexor 15 converts the color separated image signals back into a serial signal, and an A/D converter 16 converts the serial signal into a digital signal. A signal processing circuit 20 transforms the digital signal according to the operation mode of the still camera, as will be described in detail below. In a movie mode, the image signals are sent to a display circuit 22, so that a moving picture is displayed on an LCD monitor 23 in a real time fashion. In a recording mode, the signal processing circuit 20 sends the image signal to a writing circuit 24 so that the image signals are stored as digital data in a recording medium 25, e.g. a card memory. A reading circuit 26 is provided for reading the image signals from the recording medium 25, and sending the same to the signal processing circuit 20. A D/A converter 27 is connected to the signal processing circuit 20, to enable outputting the image signals in the form of composite image signal to an external device.

Figure 3:
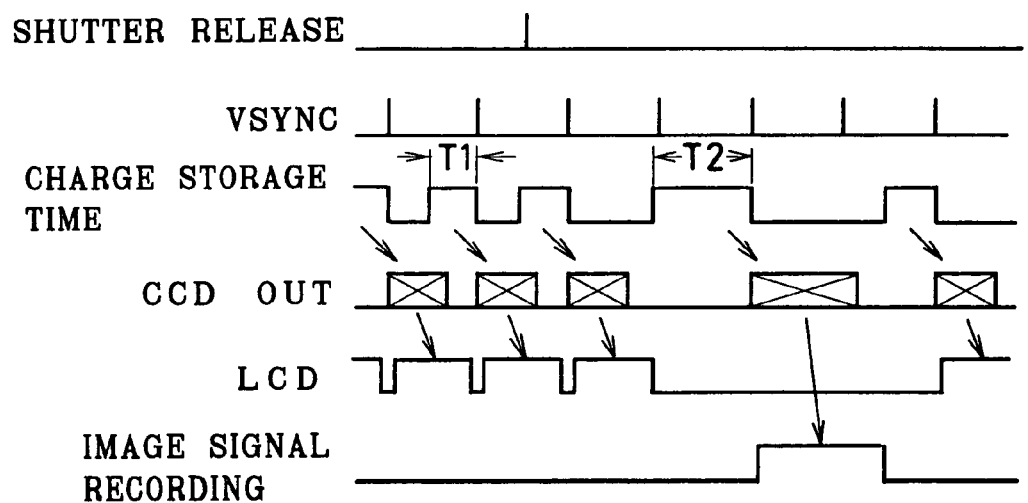
FIG. 3 shows timing charts illustrating the operation of the still camera of FIG. 1.
Figure 4:
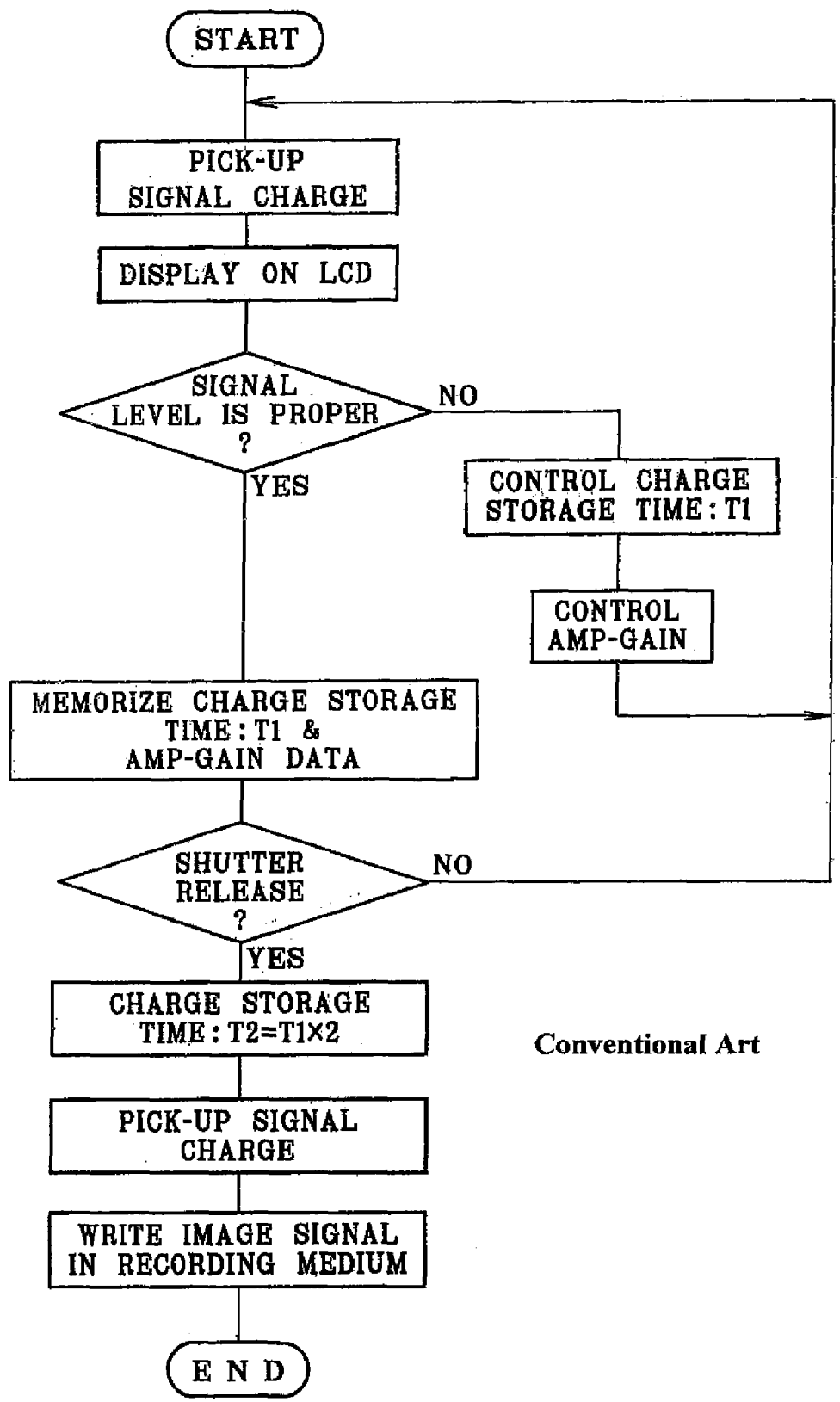
FIG. 4 shows a flow chart illustrating the operation sequence of the still camera of FIG. 1.

The operation of the still camera will be described with reference to FIGS. 3 to 4.

When a not-shown power switch is turned on, the still camera starts operating in the movie mode, wherein the system controller 10 drives the CCD image sensor 2 through the CCD driver 6 on the basis of vertical synchronizing signals VSYNC generated at the frequency of 1/60 seconds. In the movie mode, the CCD image sensor 2 is read according the pixel combination. Since the color filters 4B, 4G and 4R extend vertically in this embodiment, the pixels 3 in the same column detect the same color. Therefore, the signal charge of each pixel 3 of the even horizontal scanning lines of the CCD image sensor 2 is added to the signal charge of the pixel 3 disposed of the same column in the preceding odd horizontal scanning line, to provide image signals for a first or odd field. Thereafter, to provide image signals for a second or even field, the signal charge of each pixel 3 of the even horizontal scanning lines is added to the signal charge of the pixel 3 disposed of the same column in the following odd horizontal scanning line.

In the shown CCD image sensor 2, the filters 4B, 4G and 4R are arranged in stripes extending vertical to the horizontal scanning direction. But it is possible to use a CCD image sensor, wherein three color filters are arranged in a mosaic matrix in correspondence with the matrix arrangement of the pixels 3. In that case, the signal charge of each pixel is added to the signal charge of the nearest one of those pixels 3 which are used for detecting the same color in the adjacent horizontal scanning lines, to provide field image signals according to the pixel combination.

The image signals of each field are integrated by each color in the integration circuit 12. The system controller 10 calculates a luminance signal by weighting and then adding the integrated values of three colors, to determine whether the level of the luminance signal is proper or not. When the level is below the proper range, it means that the exposure value is too low. Then, the system controller 10 calculates a longer charge storage time T1 than before, and sends a control signal to the CCD driver 6 so as to drive the CCD image sensor 2 with the elongated charge storage time T1. On the contrary, when the level is above the proper range, the system controller 10 shortens the charge storage time T1 for the movie mode.

In this way, the exposure amount of the CCD image sensor 2 is automatically controlled to be a proper value. Of course, the charge storage time T1 for the movie mode cannot exceed 1/60 seconds. Therefore, when the exposure amount is insufficient even with the longest exposure time of 1/60 seconds, the system controller 10 raises the amplifier gains for the respective colors to upper values than given values. The latest determined charge storage time T1 and gains of the amplifier 8 are stored in the memory 13. The system controller 10 also monitors the integrated values of the three colors, and sends a control signal to the white balance circuit 9 to maintain the respective ratios of the integrated values of blue and red to the integrated value of green unchanged.

The image signals from the white balance circuit 9 are sent to the signal processing circuit 20 through the γ-corrector 14, the multiplexor 15 and the A/D converter 16. The signal processing circuit 20 interlaces the image signals of a first or odd field with those of a second or even field. That is, the signal processing circuit 20 sends the image signals of the odd fields and those of the even fields alternately to the display circuit 22. In result, a moving picture of the photographic subject is displayed in a real time fashion on the LCD 23 based on the pixel-combined image signals according to the interlace-scanning of NTSC system.

Responsive to a shutter release operation, the still camera starts operating in the recording mode. Specifically, as soon as the shutter is released, the system controller 10 determines a charge storage time T2 for the recording mode by doubling the charge storage time T1 stored in the memory 13, to assign the charge storage time T2 to the CCD driver 6. In result, the CCD image sensor 2 stores signal charges in the charge storage time T2 that is twice as long as the latest charge storage time T1 used for the preceding movie mode, wherein the charge storage time T2 for the recording mode is not more than 1/30 seconds as the charge storage time T1 for the movie mode is not more than 1/60 seconds.

In the recording mode, the signal charges of the individual pixels 3 are picked up sequentially from every horizontal scanning lines, without being pixel-combined, i.e. without adding the values of two adjacent pixels 3. Accordingly, the charge storage time T2 twice the latest charge storage time T1 provides image signals with proper signal levels in view of luminance and white balance as well.

Instead of doubling the charge storage time, the same effect results from doubling the gains of the amplifier 8 in the recording mode. It is alternatively possible to determine an aperture size for the recording mode, that is $\sqrt{2}$ as large as that used for the preceding movie mode when the photographic lens 5 has an iris diaphragm.

In this way, image signals for one frame are obtained from the signal charges of the individual pixels 3 of the CCD image sensor 2 with the charge storage time T2, and are sent to the signal processing circuit 20 through the white balance circuit 9, the γ-corrector 14, the multiplexor 15 and the A/D converter 16. The signal processing circuit 20 sends the image signals of one frame to the writing circuit 24, to write them as a still picture in the recording medium 25. Since the image signals from the individual pixels 3 are recorded, it is possible to process the image signals in the unit of a pixel.

The still camera also has a reproduction mode to display a recorded still picture. The still camera is switched to the reproduction mode in response to a not-shown manually operated mode switch. In the reproduction mode, the image signals of one frame are read from the recording medium 25 through the reading circuit 26 into the signal processing circuit 20 in a field sequential fashion. The signal processing circuit 20 operates in the same way as in the movie mode, so the image signals are sent to the display circuit 22 while repeatedly interlacing a first field of the frame with a second field. Thus, the recorded still picture is displayed on the LCD 23 according to the NTSC system. Of course, it is possible to output a composite image signal of the recorded still picture through the D/A converter 27, to display the still picture on an external CRT.

According to the above embodiment, the charge storage time or the amp-gain for the recording mode is increased by a factor of two over the preceding movie mode. However, it is possible to use another factor appropriate for setting the signal levels of the recording image signals in the same and proper range as the field image signals, i.e. for setting the luminance and color balance of the recorded still picture in the same range as the moving picture displayed on the view finder.

Thus, the present invention should not be limited to the above described embodiments but, on the contrary, various modification may be possible to those skilled in the art without departing from the scope of claims attached hereto.

What is claimed is:

1. A method of controlling an electronic still camera having a solid state imaging device including a plurality of adjacent horizontal scanning lines of individual pixels intersected by a plurality of adjacent color filters, each of a distinct color, forming columns in the solid state imaging device so that individual pixels of the plurality of adjacent horizontal scanning lines within a particular color filter detect a same color, an electronic view finder for displaying a moving picture of a photographic subject by interlace-scanning, and a recording device for recording a still picture of the photographic subject as digital data on a recording medium in response to a shutter release operation, comprising:

obtaining field image signals of an odd field by adding a signal charge stored in each of those pixels aligned in even horizontal scanning lines to a signal charge stored in one of those pixels detecting the same color in one of two adjacent odd horizontal scanning lines, each of those pixels in the even and adjacent odd scanning lines vertically aligned within the same color filter;

obtaining field image signals of an even field by adding the signal charge of each pixel of the even horizontal scanning lines to a signal charge stored in one of those pixels detecting the same color in the other of two adjacent odd horizontal scanning lines;

subjecting a white balance process to said field image signals consisting of separated red, blue and green signals in a white balance circuit, the white balance process adjusting the signal levels of a blue image signal and a red image signal to a signal level of a green image signal so that a ratio of blue to green and a ratio of red to green is maintained constant;

subjecting an output of the white balance circuit to a gradation correction in a γ-circuit;

outputting integrated values of said field images from said white balance circuit in an integrated circuit;

displaying a frame of the moving picture based on the field image signals for the odd and even fields which are outputted from said γ-circuit;

detecting signal levels of the field image signals based on said integrated values;

starting, in response to the shutter release operation, to read signal charges stored in the individual pixels by sequential scanning each horizontal scanning line, to provide image signals of one frame to record; and determining signal levels of the image signals to record based on the signal levels of the field image signals.

2. A method according to claim 1, wherein the signal levels of the image signals to record are controlled by changing exposure value or gain of an amplifier connected to an output of the solid state device.

3. A method according to claim 2, wherein the solid state device is driven with a charge storage time for obtaining the image signals to record, the charge storage time being twice as long as a charge storage time that is used for the field image signals immediately before the shutter release operation.

4. A method according to claim 2, wherein the gain of the amplifier for each color is doubled for the image signals to record, compared with that used for the field image signals immediately before the shutter release operation.

5. A method of controlling an electronic still camera having a solid state imaging device including a plurality of adjacent horizontal scanning lines of individual pixels intersected by three vertically-adjacent color separation filters forming columns in the solid state imaging device so that individual pixels of the plurality of adjacent horizontal scanning lines within a particular color filter detect a same color, an electronic view finder for displaying a moving picture of a photographic subject, and a recording device for recording a still picture of the photographic subject as digital data on a recording medium in response to a shutter release operation, comprising:

driving the solid state imaging device at a first interval corresponding to a predetermined field frequency of interlace-scanning used for displaying the moving picture;

determining a first charge storage time of the solid state imaging device in a range not more than the first interval;

obtaining field image signals of an odd field by adding a signal charge stored during the first charge storage time in each of those pixels aligned in even horizontal scanning lines to a signal charge stored in one of those pixels detecting the same color in one of two adjacent odd horizontal scanning lines, each of those pixels in the even and adjacent odd scanning lines vertically aligned within the same color separation filter;

obtaining field image signals of an even field by adding the signal charge of each pixel of the even horizontal scanning lines to a signal charge stored in one of those pixels detecting the same color in the other of two adjacent odd horizontal scanning lines;

subjecting a white balance process to said field image signals consisting of separated red, blue and green signals in a white balance circuit, the white balance process adjusting the signal levels of a blue image signal and a red image signal to a signal level of a green image signal so that a ratio of blue to green and a ratio of red to green is maintained constant;

subjecting an output of the white balance circuit to a gradation correction in a γ-circuit;

outputting integrated values of said field images from said white balance circuit in an integrated circuit;

displaying a frame of the moving picture based on the field image signals for the odd and even fields, which are outputted from said γ-circuit by interlace-scanning;

detecting signal levels of the field image signals based on said integrated values;

revising the first charge storage time in accordance with the detected signal levels;

determining, in response to the shutter release operation, a second charge storage time based on the first charge storage time;

obtaining image signals for one frame from signal charges stored during the second charge storage time in the individual pixels of the solid state imaging device by sequential scanning of each horizontal scanning line; and recording the image signals of one frame as a still picture in the recording medium.

6. A method according to claim 5, wherein the second charge storage time is twice as long as the first charge storage time.

* * * * *